(12) United States Patent
Matsudaira et al.

(10) Patent No.: US 7,578,767 B2
(45) Date of Patent: Aug. 25, 2009

(54) AUTOMATIC TRANSMISSION CONTROL DEVICE

(75) Inventors: Naotada Matsudaira, Wako (JP); Soya Uchida, Wako (JP); Go Morita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 11/533,081

(22) Filed: Sep. 19, 2006

(65) Prior Publication Data

US 2007/0066443 A1   Mar. 22, 2007

(30) Foreign Application Priority Data

Sep. 22, 2005   (JP) .............................. 2005-276537

(51) Int. Cl.
*B60W 10/04* (2006.01)
*B60W 10/10* (2006.01)
*F16H 59/48* (2006.01)

(52) U.S. Cl. ...................................... 477/115; 477/120
(58) Field of Classification Search ................. 477/115, 477/120
See application file for complete search history.

(56) References Cited

U.S. PATENT DOCUMENTS

| 4,599,917 | A | * | 7/1986 | Leorat et al. ................. 477/120 |
| 4,846,020 | A | * | 7/1989 | Kondo et al. ................. 477/125 |
| 5,025,684 | A | | 6/1991 | Stehle et al. |
| 5,097,725 | A | * | 3/1992 | Sawa .......................... 477/129 |
| 5,474,505 | A | | 12/1995 | Seidel et al. |
| 5,941,793 | A | * | 8/1999 | Ito et al. ...................... 477/120 |
| 6,000,378 | A | * | 12/1999 | Minowa et al. ............. 123/436 |
| 6,090,012 | A | | 7/2000 | Hollingsworth et al. |
| 6,459,977 | B1 | * | 10/2002 | Taffin et al. ................... 701/51 |

FOREIGN PATENT DOCUMENTS

| EP | 1342939 A2 | 9/2003 |
| JP | 63-072950 A | 4/1988 |
| JP | 63-207735 A | 9/1988 |
| TW | 200307624 A | 5/2002 |

OTHER PUBLICATIONS

European Search Report dated Nov. 17, 2006, issued in corresponding European Application No. 06 01 6117.

* cited by examiner

*Primary Examiner*—Tisha D Lewis
(74) *Attorney, Agent, or Firm*—Westerman, Hattori, Daniels & Adrian, LLP.

(57) ABSTRACT

An automatic transmission control device for a vehicle includes a gear change operation that is performed based on a throttle opening, a vehicle speed and an engine rotational speed. The automatic transmission control device also obtains a displacement of the throttle opening, determines whether the displacement falls within a predetermined range, and restricts a shift-up when the displacement exceeds the predetermined range.

3 Claims, 8 Drawing Sheets

| | gear step at the time of performing shift-up | predetermined range of $\Delta Th$ |
|---|---|---|
| A | 1 → 2 | $+\alpha \sim -\beta$ |
| B | 2 → 3 | $+\alpha \sim -\beta$ |
| C | 3 → 4 | $+\gamma \sim -\delta$ |
| D | 4 → 5 | $+\gamma \sim -\delta$ |
| E | 5 → 6 | $+\gamma \sim -\delta$ |
| F | 6 → 7 | $+\gamma \sim -\delta$ |

※ in table, $|\alpha| = |\beta|$, $|\gamma| < |\delta|$, $|\delta| < |\alpha|$

FIG. 12

AUTOMATIC TRANSMISSION CONTROL DEVICE

TECHNICAL FIELD

The present invention relates to an automatic transmission control device, and more particularly to an automatic transmission control device which can effectively restrict a shift-up during cornering using the simple constitution.

BACKGROUND OF THE INVENTION

A vehicular automatic transmission is known that induces a transmission rotational speed from a predetermined map based on a vehicle speed and a load of an engine and automatically performs the gear change operation based on the transmission rotational speed. There has also been known a transmission control device which is configured such that the gear change operation (which brings about changes of an engine rotational speed and an engine output) is restricted when it is determined that the vehicle is turning or cornering.

For example, JP-A-63-72950 discloses a transmission control device which determines whether the vehicle is turning based on at least a vehicle speed and a steering angle of a steering wheel and restricts a shift-down of the automatic transmission. According to this transmission control device, it is possible to restrict the shift-down only when the vehicle is turning in which the vehicle travels with predetermined vehicle speed and steering angle or more.

Further, JP-A-63-207735 discloses an automatic transmission which includes a releasing device which, when a state in which a steering angle assumes a predetermined value or less is continued for a predetermined time or more, releases the restriction of a shift change which is carried out when the cornering is performed as in the case of JP-A-63-72950.

The above-mentioned transmission control device is particularly applicable to a motorcycle which controls a posture of a vehicle body during cornering by adjusting a driving force. For example, as a shift-up during turning typically adversely influences vehicle riding feeling, there may also be a case in which immediately after a throttle is subject to an open operation to impart a larger driving force to stabilize the posture of the vehicle body, a transmission rotational speed reaches the above-mentioned transmission rotational speed thus automatically causing a shift-up. The technique disclosed in JP-A-63-72950 can restrict such a shift-up.

However, the technique in JP-A-63-72950 requires means for detecting a steering angle of a steering wheel and hence, there exists a drawback that a control system for restricting the shift-up during turning becomes complicated. Further, because, for example, a steering angle of the motorcycle during turning is small (e.g., compared to a steering angle of a four-wheeled vehicle during turning), there has been a demand for a system which can determine that the motorcycle is turning by an element other than the steering angle.

Therefore, it is an object of the present invention, for example, to provide an automatic transmission control device which can overcome a task of the above-mentioned related art and can effectively restrict a shift-up during cornering with the simple constitution.

SUMMARY OF THE INVENTION

The preferred embodiments of the present invention have been developed in view of the above-mentioned and/or other problems in the related art. The preferred embodiments of the present invention can improve upon existing methods and/or apparatuses.

According to one aspect of the present invention, an automatic transmission control device for a vehicle is provided wherein a gear change operation is performed based on a throttle opening, a vehicle speed and an engine rotational speed. The automatic transmission control device also includes a means which obtains a displacement of the throttle opening, a means which determines whether the displacement falls within a predetermined range, and a means which restricts a shift-up when the displacement exceeds the predetermined range. Accordingly, it is possible to effectively restrict an undesired shift-up during turning.

According to another aspect of the present invention, the shift-up means restricts the shift-up for a predetermined period even immediately after the displacement of the throttle opening falls within the predetermined range. Thus, it is possible to reflect the opening manipulation of the throttle which is performed for controlling a posture of a vehicle body during turning.

According to another aspect of the present invention, the predetermined range differs corresponding to a gear step at the time of performing the shift-up. Accordingly, for example, at the time of low-speed-gear traveling which requires no restriction of the shift-up for accelerating manipulation or the like, by setting the displacement of the opening of the throttle which allows the shift-up larger than such displacement at the time of high-speed gear traveling, it is possible to prevent the shift-up restricting control from being performed.

According to another aspect of the present invention, the predetermined range is constituted of a numerical value on a predetermined plus side and a numerical value on a predetermined minus side, and an absolute value of the numerical value on the predetermined plus side is set smaller than an absolute value of the numerical value on the predetermined minus side at a predetermined gear step. Accordingly, the automatic transmission control device can perform an automatic transmission controlling corresponding to the traveling states at the time of cruising and cornering of the motorcycle. That is, a ΔTh on the plus-side is set smaller than a ΔTh on the minus-side and hence, the ΔTh hardly falls within a predetermined range during cornering thus restricting the shift-up effectively. Further, the ΔTh on the minus-side is set to a large value and hence, the ΔTh is likely to fall within an automatic transmission permissible range at the time of cruising thus avoiding the undesired prohibition of the shift-up.

According to another aspect of the present invention, the automatic transmission control device is for a motorcycle. Thus, it is possible to obtain the automatic transmission control device which conforms to the motion characteristic of a motorcycle and provides improved riding feeling to a rider.

BRIEF DESCRIPTION OF THE DRAWINGS

The preferred embodiments of the present invention are shown by way of example, and not limitation, in the accompanying figures, in which:

FIG. 12 is a correspondence table of a gear step at a time of performing a shift-up and a predetermined range of ΔTh.

DETAILED DESCRIPTION OF THE INVENTION

In the following paragraphs, some embodiments of the invention will be described by way of example and not limitation. It should be understood based on this disclosure that various other modifications can be made by those in the art based on these illustrated embodiments.

Figure 1:
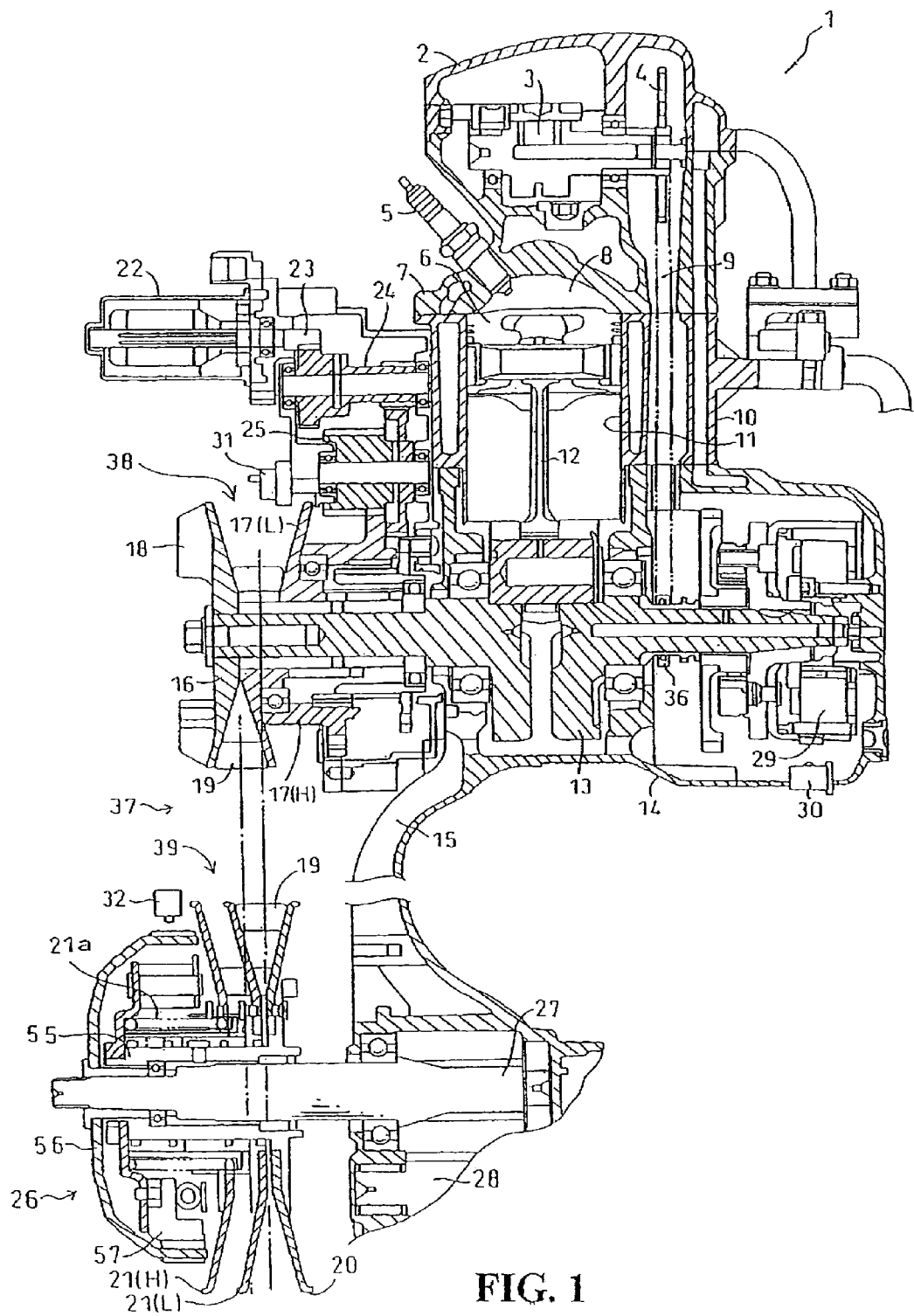
FIG. 1 is a cross-sectional view of a power unit in a motorcycle according to one embodiment of the present invention.

FIG. 1 shows a cross-sectional view of a power unit of a scooter-type motorcycle which adopts an automatic transmission control device according to one embodiment of the present invention. A unit-swing type power unit 1 which is integrally constituted of an engine and a continuously variable transmission which transmits a driving force of the engine to a driving wheel at a proper gear ratio is, assuming the lateral direction in the drawing as the vehicle width direction, connected to a pivot portion arranged on a rear portion of the scooter-type motorcycle in a rockable manner. A piston 6 is connected to a crankshaft 13 which constitutes an output shaft of the engine by way of a connecting rod 12, and the piston 6 is slidably arranged in the inside of a cylinder 11 which is mounted in a cylinder block 10. A cylinder head 7 is fixed to an upper end of the cylinder block 10, and a combustion chamber 8 in which air-fuel mixture is burned is formed of the cylinder head 7, the cylinder 11 and the piston 6.

In the cylinder head 7, a valve (not shown in the drawing) which controls an intake and an exhaust of the air-fuel mixture to and from the combustion chamber and an ignition plug 5 which ignites the compressed air-fuel mixture are arranged. An open/close operation of the valve is controlled by the rotation of a cam shaft 3 which is pivotally supported on the cylinder head 7. A driven sprocket wheel 4 is provided to a right end portion of the cam shaft 3, e.g., above which a cylinder head cover 2 is arranged, and an endless belt, cam chain 9, or the like is extended between and is wound around the driven sprocket wheel 4 and a drive sprocket wheel 36 which is mounted on the crankshaft 13.

A starter motor, e.g., ACG starter motor 29, which is attached, for example, to a right end portion of the crankshaft 13 is accommodated in a right end portion of the crank case 14 which pivotally supports the crankshaft 13. In the vicinity of the ACG starter motor 29, a Ne sensor 30 which detects a rotational speed of the engine based on a rotational speed of the ACG starter motor 29 is provided. On one hand, a continuously variable transmission 37 which is constituted of a drive-side pulley 38, a V belt 19 and a driven-side pulley 39 is connected to a left side of the crankshaft 13 in the drawing. Here, a fan 18 which is rotated in synchronism with the crankshaft 13 and forcibly cools the continuously variable transmission 37 and the like is formed on the drive-side pulley 38. The continuously variable transmission 37 is a continuously variable-transmission belt converter which is constituted by extending the endless-type V belt 19 between the drive-side pulley 38 which is connected to a left end portion of the crankshaft 13 and a driven-side pulley 39 which is mounted on a drive shaft 27 which is pivotally supported on a transmission case 15 and is arranged in parallel to the crankshaft 13 by way of a start clutch 26. The continuously variable transmission 37 according to the present invention includes a gear ratio control motor 22 for arbitrarily changing a gear ratio in the vicinity of the drive-side pulley 38.

The drive-side pulley 38 includes a drive-side fixed pulley half body 16 which is attached, for example, to a left end portion of the crankshaft 13 and a drive-side movable pulley half body 17 which is slidably mounted on the crankshaft 13 in the axial direction of the crank shaft 13. In the drawing, the drive-side movable pulley half body 17 is provided with a feed screw on a right side thereof. By rotating the drive-side movable pulley half body 17 with a driving force of the gear ratio control motor 22 which is transmitted by way of a pinion gear 23, a first transmission gear 24 and a second transmission gear 25, the drive-side movable pulley half body 17 is slidably movable in the axial direction of the crankshaft 13. Here, in the vicinity of the drive-side movable pulley half body 17, a gear ratio sensor 31 which can detect a gear ratio by detecting a position of the drive-side movable pulley half body 17 is provided.

On the other hand, the driven-side pulley 39 includes a driven-side fixed pulley half body 20 which is attached to a sleeve 55 integrally rotated with a rotor which holds a clutch shoe 57 of the start clutch 26 and a driven-side movable pulley half body 21 which is slidably movable in the axial direction of the sleeve 55. Further, the V belt 19 is extended between and is wound around substantially V-shaped cross-section belt grooves which are respectively formed between the drive-side fixed pulley half body 16 and the drive-side movable pulley half body 17 and between the driven-side fixed pulley half body 20 and the driven-side movable pulley half body 21. Further, on a back side of the driven-side movable pulley half body 21, a spring 21a which biases the driven-side movable pulley half body 21 toward the driven-side fixed pulley half body 20 is provided.

The start clutch 26 interrupts, for example, when a rotational speed of the driven-side pulley 39 does not reach a predetermined value, the transmission of a driving force between the driven-side pulley 39 and the drive shaft 27. Then, when the rotational speed of the engine is increased and the rotational speed of the driven-side pulley 39 becomes the predetermined value or more, for example, the clutch shoe 57 pushes an inner peripheral surface of an outer case 56 by a centrifugal force. Accordingly, the rotation of the driven-side pulley 39 is transmitted to the outer case 56 by way of the sleeve 55 and the clutch shoe 57 and hence, the drive shaft 27 which is fixed to the outer case 56, a power transmitting shaft 28 which is meshed with the drive shaft 27, and an axle (not shown in the drawing) of a drive wheel which is meshed with the transmitting shaft 28 are rotated. Here, in the vicinity of the outer case 56, a vehicle speed sensor 32 which detects a vehicle speed based on the rotational speed of the outer case 56 is provided.

The shift of the gear ratio of the continuously variable transmission 37 is performed, for example, by rotatably driving the gear ratio control motor 22 in the direction corresponding to up/down shifting of the gear ratio. When the rotational direction of the gear ratio control motor 22 is directed in the shift-up direction (top ratio direction), the drive-side movable pulley half body 17 is allowed to slide in the left direction in the drawing. Then, when the drive-side movable pulley half body 17 approaches the drive-side fixed pulley half body 16 by an amount corresponding to the sliding of the drive-side movable pulley half body 17, the belt groove width on the drive-side pulley 38 is decreased. Accordingly, a contact position between the drive-side pulley 38 and the V belt 19 is shifted in the radially outward direction and hence, a wrapping diameter of the V belt 19 is increased (in the drawing, a low ratio position 17 (L) shown above the crankshaft 13 and a top ratio position (H) shown below the crankshaft 13).

Along with the above-mentioned gear change operation, in the driven-side pulley 39, a distance between the crankshaft 13 and the drive shaft 27 is unchanged and the V belt 19 is an endless belt and hence, a force which tends to reduce the wrapping diameter acts. Accordingly, the driven-side movable pulley half body 21 slides in the leftward direction in the drawing against a resilient force which a spring 21a biases, and a groove width which is defined, for example, by the driven-side fixed pulley half body 20 and the driven-side movable pulley half body 21 is increased. In this manner, the change of the gear ratio of the continuously variable transmission 37 is realized by continuously changing the wrapping diameter (power transmission pitch diameter) of the V belt 19.

As described above, the continuously variable transmission 37 according to this embodiment can steplessly select an arbitrary gear ratio by controlling the gear ratio control motor 22. Accordingly, depending on the manner of controlling the gear ratio control motor 22, not to mention that the vehicle can travel smoothly based on the continuously variable transmission, by setting a plurality of fixed gear ratios (for example, 7 steps), it is possible to perform a manual-transmission gear change control in which a rider can carry out the shift change between fixed gear ratios as well as a gear change control which allows the rider to obtain the riding feeling such as a manual-auto-shifting motorcycle in which an automatic gear change is performed in a stepped transmission.

Figure 2:
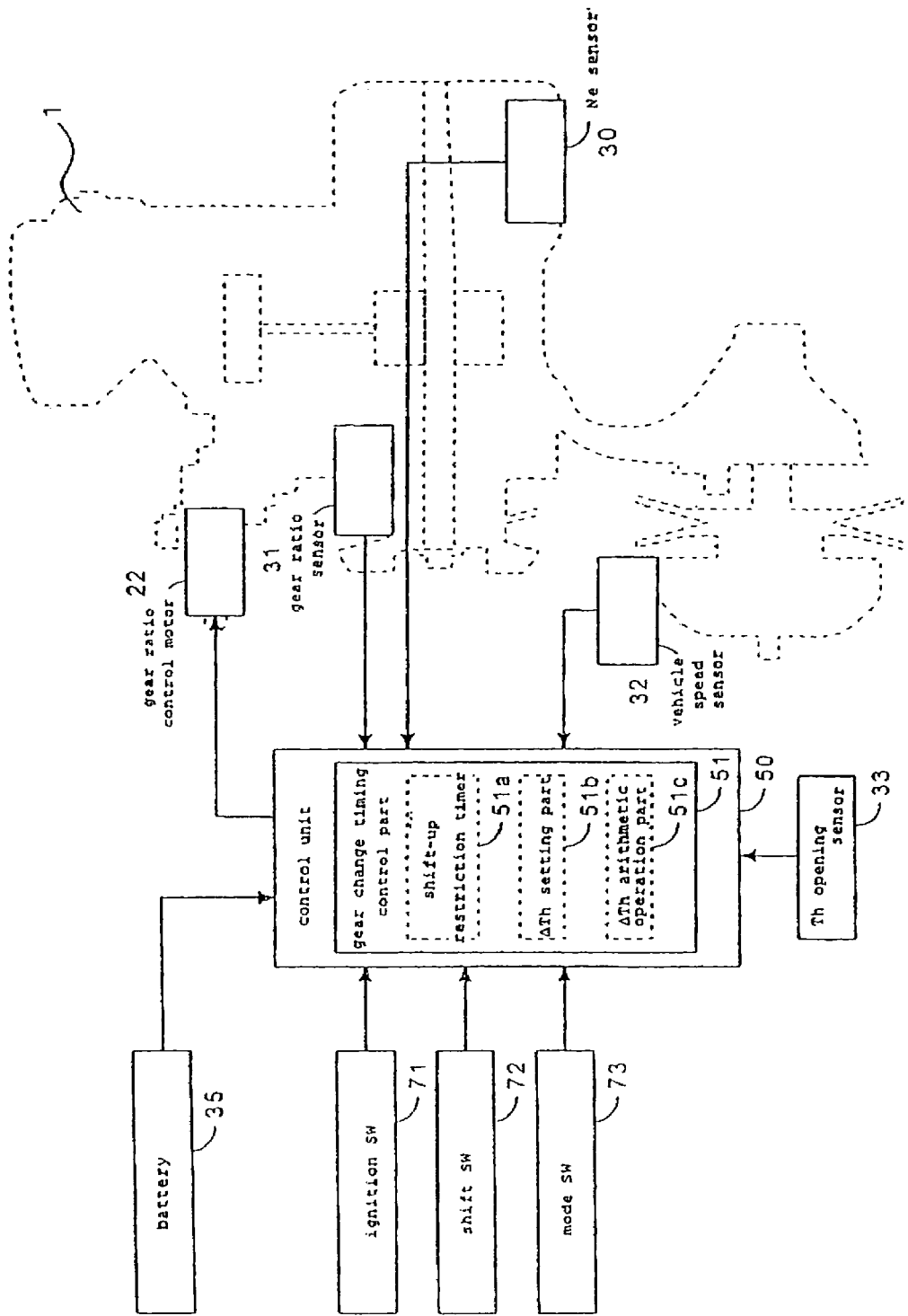
FIG. 2 is a block diagram showing a constitution of an automatic transmission control device according to one embodiment of the present invention.

FIG. 2 is a block diagram showing the constitution of the automatic transmission control device according to an embodiment of the present invention. A battery 35 which is mounted on the motorcycle supplies electricity or power to a control unit 50 which is mounted on an arbitrary portion of the motorcycle and the gear ratio control motor 22. The power which drives the gear ratio control motor 22 is controlled and supplied by the control unit 50. When an ignition SW 71 which constitutes a main switch is turned on, the control unit 50 is started. The control unit 50 gives command signals to the gear ratio control motor 22 based on informations supplied, for example, from a gear ratio sensor 31, an Ne sensor 30, a vehicle speed sensor 32 and a Th opening sensor 33 which detects an opening of a throttle valve (not shown in the drawing) which are arranged in the power unit 1.

In the inside of the control unit 50, a shift-up restriction timer 51a which constitutes a means for restricting the shift-up, a ΔTh setting part 51b which constitutes a means for setting a predetermined range of displacement of the throttle opening, and a ΔTh calculation part 51c which constitutes a means for calculating the displacement of the throttle opening are provided. Here, contents of the command signals are also changed corresponding to a manipulation state of a shift SW 72 which constitutes a switch for manually performing the shift change, and a mode SW 73 which changes over a gear change mode of the automatic transmission device. Details of the shift change and the gear change modes in this embodiment are described later.

Figure 3:
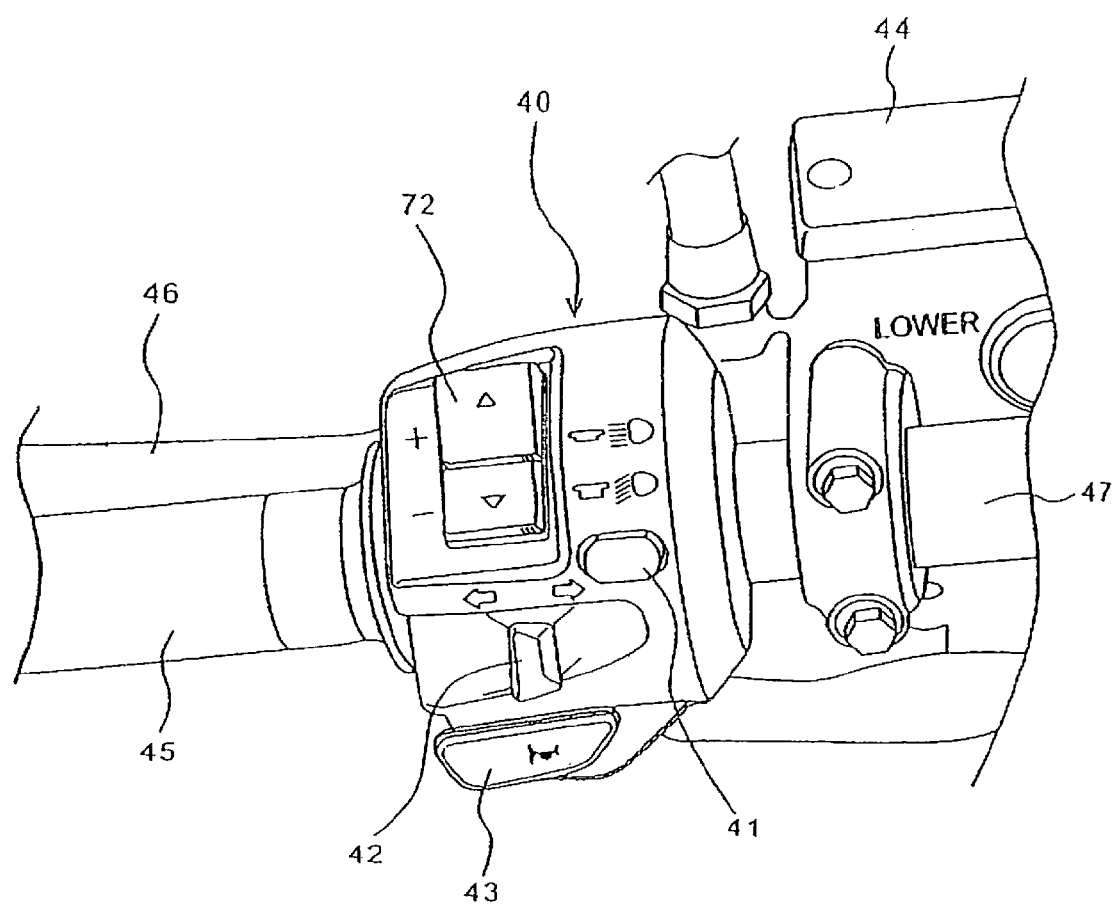
FIG. 3 is a perspective view of a left-side handle switch which is applied to a motorcycle according to one embodiment of the present invention.

FIG. 3 is a perspective view of a left handle switch which is adopted by the motorcycle according to one embodiment of the present invention. On a left portion of a pipe-like handle 47 in the drawing, for example, a left handle grip 45 is mounted, while in front of the handle 47 in the longitudinal direction of the vehicle, for example, a left brake lever 46 is arranged. Further, between the left handle grip 45 and a brake fluid reservoir tank 44, for example, a left switch case 40 is arranged. On the left switch case 40, for example, a blinker switch 42, a horn switch 43, an optical axis selector switch 41 of a head light, and the shift SW 72 which toggles or rocks in a plus direction (+) and a minus direction (−) from a neutral state are mounted.

Figure 4:
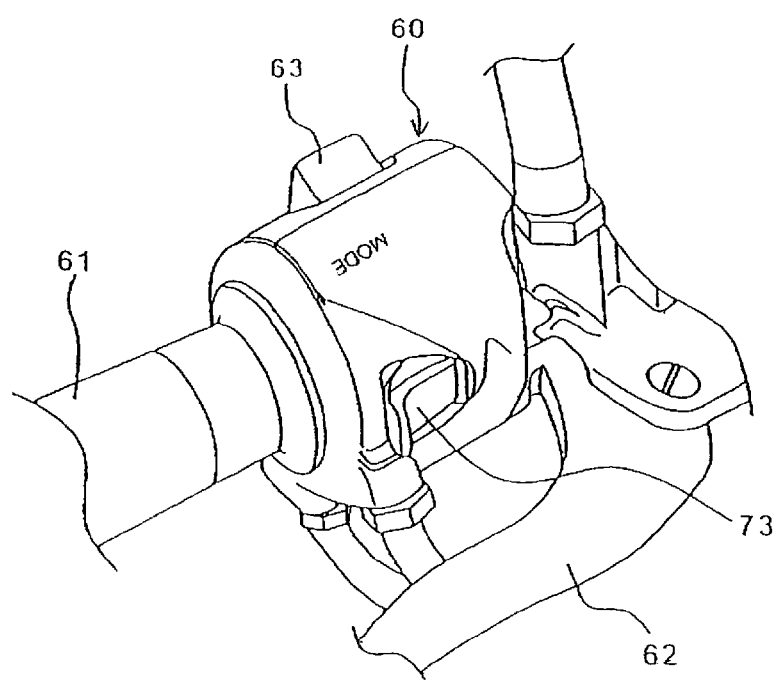
FIG. 4 is a perspective view of a right-side handle switch which is applied to a motorcycle according to one embodiment of the present invention.

FIG. 4 is a perspective view of a right handle switch which is adopted by the motorcycle according to this embodiment of the present invention. In FIG. 4, a state as viewed from a front side of the vehicle is shown. On the right handle which may be integrally formed with the handle 47, a right handle grip 61 is provided, and a right switch case 60 is arranged in the vicinity of a right brake lever 62. On the right-side switch case 60, for example, a kill switch 63 (e.g., stops the engine in an emergency) and a mode SW 73 that is manipulated by a forefinger of rider's right hand are provided.

Figure 5:
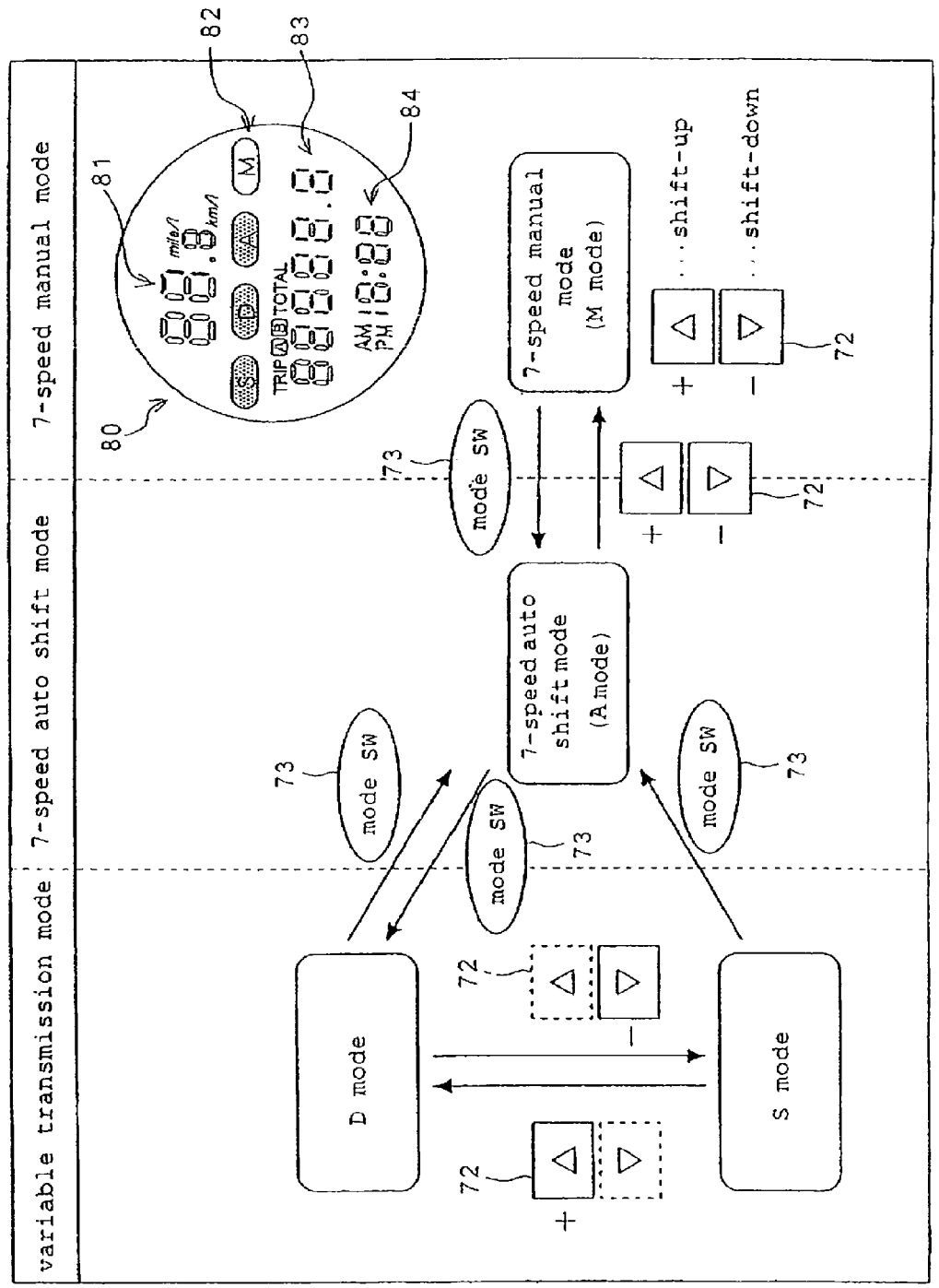
FIG. 5 is a schematic explanatory view of a changeover of gear change modes of an automatic transmission control device according to one embodiment of the present invention.

FIG. 5 is a schematic explanatory view of a gear change mode switching of the transmission control device according to one embodiment of the present invention. As described above, in this embodiment for example, a "continuously variable gear change mode" in which a mode is selected from two kinds of modes consisting of a D mode which emphasizes a fuel consumption performance and an S mode which emphasizes an accelerating performance, a "7-gear manual transmission mode" in which the gear ratio is changed over out of arbitrarily set seven gear steps by a rider's instruction and a "7-gear automatic shift mode" which provides the riding feeling as if the automatic transmission is performed using the 7-steps transmission are prepared. With respect to a switching manipulation of the respective gear change modes, the switching between the D mode and the S mode is performed using the shift SW 72. When the mode SW 73 is pushed from the D mode or the S mode state, it is possible to change over the mode to the 7-gear automatic shift mode (A mode). Further, when the either one of "up" or "down" of the shift SW 72 is pushed in the A mode state, the A mode is switched into the 7-gear manual shift mode (M mode). In the M mode, for example, 7-step gear change manipulation can be performed arbitrarily using the shift SW 72. Further, when the mode SW 73 is pushed from the M mode, the M mode is changed over to the A mode. Further, when the mode SW 73 is pushed, the A mode is changed over to the D mode.

To allow the rider to confirm the switching states of the respective gear change modes, for example, the switching state is displayed in a display part 80 which is arranged inside of a meter panel. In the display part 80, a gear change mode indicator 82, for example, which indicates the switching state of the respective gear change modes based on lightning of a lamp, is arranged above a clock display portion 84 and a trip meter 83. Further, above the gear change mode indicator 82, a shift indicator 81, for example, which displays the present gear step change in the M mode or in the A mode is arranged.

Here, the shift indicator 81 is also used as a fuel consumption meter which indicates fuel consumption in a predetermined section.

Figure 6:
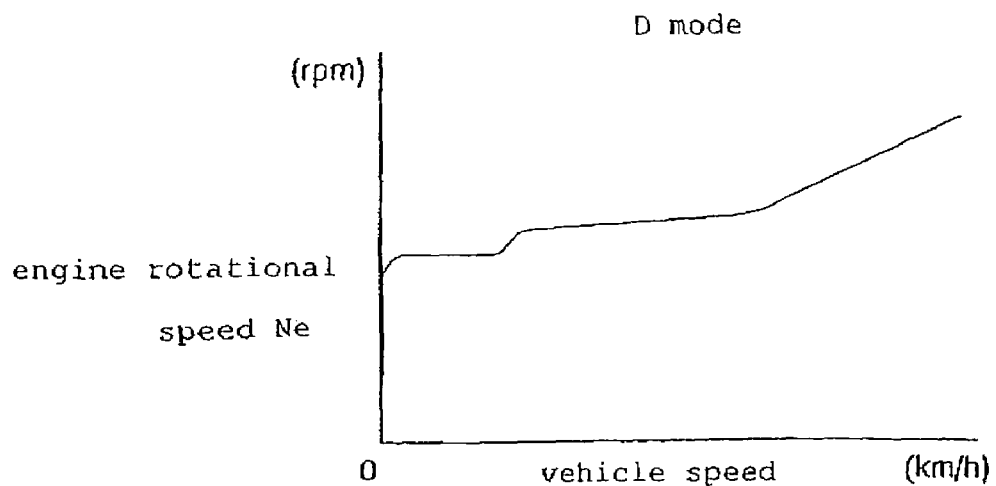
FIG. 6 is a transmission characteristic graph in a D mode of an automatic transmission control device according to one embodiment of the present invention.
Figure 7:
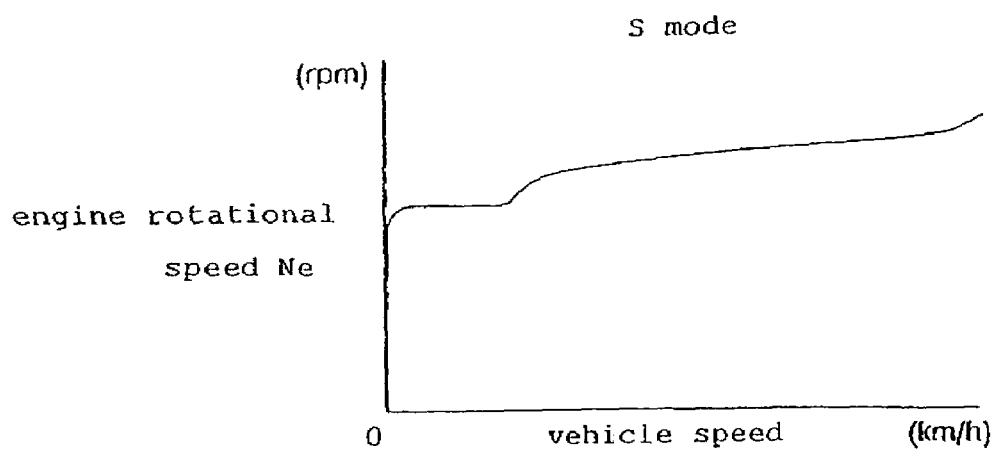
FIG. 7 is a transmission characteristic graph in an S mode of an automatic transmission control device according to one embodiment of the present invention.
Figure 8:
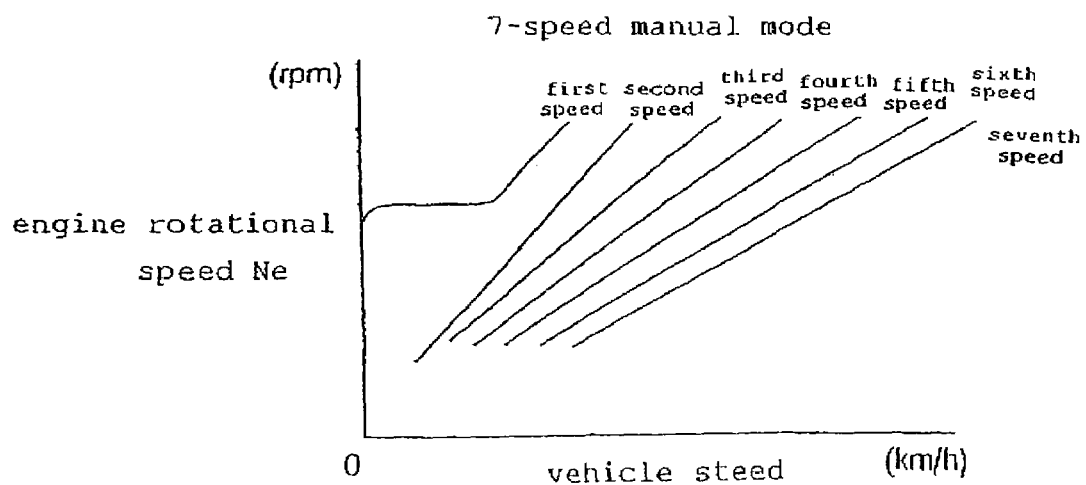
FIG. 8 is a transmission characteristic graph in an M mode of an automatic transmission control device according to one embodiment of the present invention.

FIGS. 6-8 illustrate one example of transmission characteristic graphs in the above-mentioned D mode, S mode and M mode. The D mode (FIG. 6) shifts a gear ratio in the top ratio direction in a state that the engine rotational speed is relatively low by taking the fuel consumption performance into consideration. The S mode (FIG. 7) (e.g., which requires sharp traveling) sets the gear ratio such that the engine rotational speed Ne is held at a high state as a whole. In the M mode (FIG. 8), fixed gear ratios are set in the same manner as the usual stepped transmission. In the above-mentioned 7-step auto shift mode (A mode), between fixed gear ratios which are applied to the M mode, the gear ratio is set such that the shift change is automatically performed.

Here, inventors of the present invention focus on a point that in the conventional automatic transmission device, when cruising is performed at a fixed speed, the gear ratio is set such that the shift-up is performed one after another to enable the traveling at the engine rotational speed as low as possible. Due to such setting of the gear ratio, when the vehicle arrives at the corner during traveling in the above-mentioned A mode, unless a state that the vehicle is during cornering or during cruising is detected by a certain means, the shift-up which brings about the change of the engine rotational speed or the engine output is performed in the same manner as the cruising even when the vehicle is cornering whereby the riding feeling is adversely affected. To cope with such a drawback, the automatic transmission control device of this embodiment is characterized in that whether the motorcycle is during turning/cornering at present is determined by taking a value of $\Delta Th$ (i.e., which is the displacement (change rate) of the throttle opening Th per unit time into consideration), and when it is determined that the motorcycle is "during cornering", the shift-up is restricted for a predetermined time. Next, the shift-up restriction control which is applicable to the automatic transmission control device according to one embodiment of the present invention is explained in detail in conjunction with a flow chart shown in FIG. 9.

Figure 9:
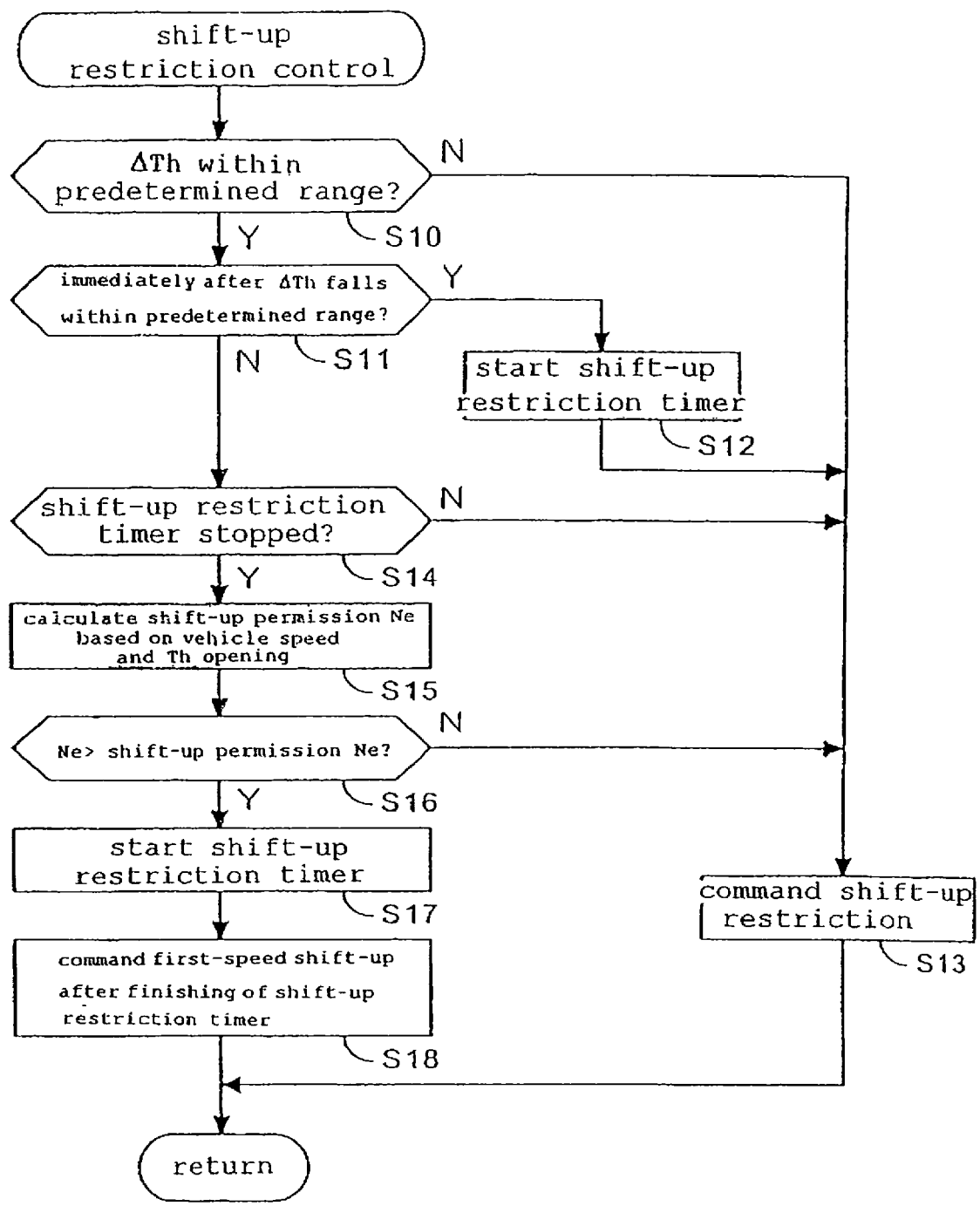
FIG. 9 is a flow chart showing steps of a shift-up restriction control according to one embodiment of the present invention.

FIG. 9 is the flow chart showing steps of the shift-up restriction control which the control unit 50 applies to the gear ratio control motor 22 in FIG. 2. The flow chart is repeatedly executed at a predetermined cycle. First of all, in step S10, whether the above-mentioned $\Delta Th$ is within a predetermined range or not is determined by a gear change timing control part 51 in the inside of the control unit 50. Here, $\Delta Th$ indicates the displacement of the throttle opening Th per unit time. Further, the predetermined range indicates an arbitrarily set range which extends in the plus direction and in the minus direction while striding over a zero state. The range is stored, for example, in a $\Delta Th$ setting part 51b in the inside of the throttle change gear timing control part 51.

In general, in manipulating the throttle of the motorcycle at the time of turning, the throttle is manipulated in the closing direction in front of the turn. Then, the throttle is manipulated in the opening direction to control the posture of the vehicle body during turning. Thereafter, by racing the motorcycle toward an exit of the corner, the throttle is largely manipulated in the opening direction. In such cornering, when the vehicle body is banked and, at the same time, the shift-up is performed during manipulation of the throttle in the opening direction to control the posture of the vehicle body or immediately after such manipulation, there may be a case that the riding feeling is adversely influenced. Accordingly, in step S10, the state that the $\Delta Th$ does not fall within a predetermined range (the determination in step S10 being negative) is determined as a state that the throttle opening manipulation for controlling the posture of the vehicle body is performed. In this case, the processing advances to step S13 and the shift-up is restricted, Here, the manner of determining whether the motorcycle is during cornering or not or during cruising or not. In the throttle manipulation during cornering, after manipulating the throttle in the opening direction to control the posture of the vehicle body, the throttle opening is stabilized in the throttle opening direction. On the other hand, in cruising in which the motorcycle travels at a fixed speed, the throttle opening is stabilized in the direction to close the throttle from a state that the throttle is opened to accelerate the motorcycle to an arbitrary speed. From the above, to focus on the displacement $\Delta Th$ of the throttle opening Th, when the $\Delta Th$ shifts toward a stable state (zero displacement) from the plus direction, it is estimated that the motorcycle is during posture control at the time of cornering, while when the $\Delta Th$ shifts toward a stable state (zero displacement) from the minus direction, it is estimated that the motorcycle is during cruising.

Figure 10:
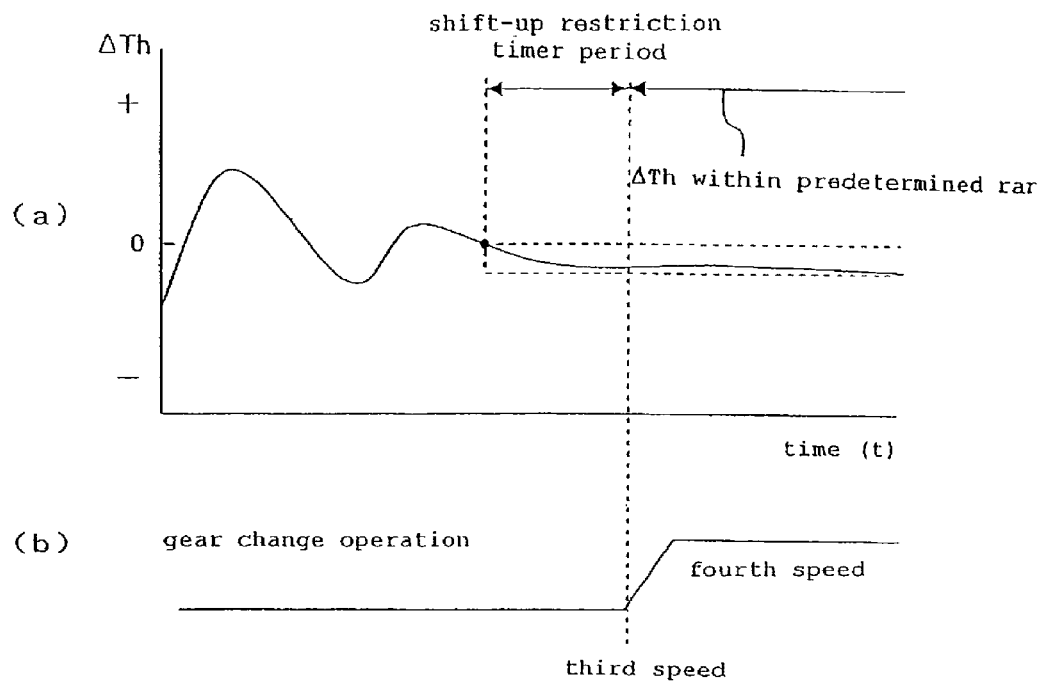
FIG. 10 is a schematic explanatory view showing a relationship between a predetermined range of ΔTh and a gear change operation.

Further, in step S10, whether the $\Delta Th$ falls within a predetermined range or not may be determined, as a graph on the relationship between $\Delta Th$ and time shown in FIG. 10(*a*) indicates, by comparing the $\Delta Th$ derived from the gear change timing control part 51 in the inside of the control unit 50 based on the throttle opening Th which is detected by the throttle opening sensor 33 and an arbitrarily set predetermined range of $\Delta Th$. Here, FIG. 10(*b*) shows the relationship between a gear ratio of the continuously variable transmission 37 and a shift-up restriction timer period. In an example shown in the drawing, at a point of time that the shift-up restriction timer period finishes, the gear ratio is shifted up from the third-speed gear to the fourth-speed gear.

Returning to the flow chart shown in FIG. 9, when it is determined that the $\Delta Th$ falls within the predetermined range in step S10, the processing advances to step S11 and whether it is immediately after the $\Delta Th$ falls within the predetermined range or not is determined. When the determination is that it is immediately after the $\Delta Th$ falls within the predetermined range, the processing advances to step S12 and a shift-up restriction timer 51a which is installed in the inside of the gear change timing control part 51 starts counting. The traveling condition which starts the shift-up restriction timer 51a in step S12 corresponds to a state immediately after the throttle opening manipulation during cornering. Accordingly, due to the determination made in step S11, it is possible to prevent the shift-up immediately after the control of the posture of the vehicle body at the time of cornering. Here, a counting time of the shift-up restriction timer 51a is set to 0.5 second, for example.

Figure 11:
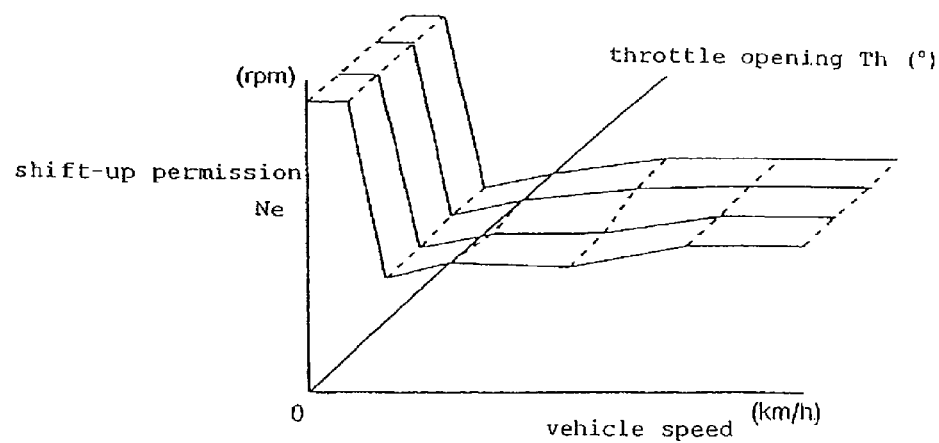
FIG. 11 is a shift-up permission Ne map which is applied to a shift-up restriction control according to one embodiment of the present invention.

Returning to step S11, when the determination is that it is not immediately after the $\Delta Th$ falls within the predetermined range, the processing advances to step S14 and whether the shift-up restriction timer 51a is stopped or not is determined. When it is determined that the shift-up restriction timer 51a is stopped in step S14, in succeeding step S15, a shift-up permission Ne is obtained based on a vehicle speed and the throttle opening Th from a shift-up permission Ne map shown in FIG. 11. Next, in step S16, whether the engine rotational speed Ne exceeds the shift-up Ne or not is determined and, when the determination is affirmative, the processing advances to step S17 and the shift-up restriction timer 51a starts the counting. The determination in step S16 is performed in a traveling state that the engine rotational speed Ne is increased while the $\Delta Th$ is held within the predetermined range, that is, the displacement of the throttle opening $\Delta Th$ is kept small. This traveling state corresponds to the cruising or a case in which opening manipulation of the throttle is performed with an approximately fixed opening toward the rising of the corner after the posture controlling during cornering. Even in such traveling state, the processing is set such that the shift-up is not performed immediately after the engine rotational speed exceeds the predetermined shift-up permission Ne, but the shift-up is slightly delayed by the shift-up restriction timer 51a. Due to such setting, it is possible, for example, to prevent the continuous shift-up and hence, a rider can obtain the favorable shift-up feeling which conforms to a sense of the rider. Then, in step S18, at a point of time that the counting by the shift-up restriction timer 51a is finished, the gear ratio is configured to be shifted up by one speed and hence, the shift-up which conforms to the actual traveling is performed.

Here, at the time of cruising in which the motorcycle cruises at a fixed speed, the vehicle body is not banked and hence, it is unnecessary to restrict the shift-up as in the case of cornering. Further, In a traveling state in which the vehicle speed is relatively low, even when the shift-up is performed slightly earlier, the riding feeling is not largely influenced by such shift-up and hence, it is unnecessary to restrict the shift-up. Accordingly, during cruising or during low-speed traveling, it is desirable that the above-mentioned shift-up restriction control is not performed. This task can be overcome by changing the predetermined range of $\Delta Th$ corresponding to the gear step for performing the respective shift-ups.

FIG. 12 shows a correspondence table between the gear step and the predetermined range of $\Delta Th$ at the time of performing the shift-up. On a left end of the drawing, A to F (which indicate modes for changing over the gear step) are described. On the center of the drawing, the gear step at the time of performing the shift-up which are contents of the modes A to F are described. On the right end of the drawing, the predetermined ranges of $\Delta Th$ are described. In the drawing, the Greek alphabets which indicate the predetermined ranges of $\Delta Th$ have relationships of $|\alpha|=|\beta|$, $|\gamma|<|\delta|$, $|\delta|<|\alpha|$. Further, the predetermined ranges of $\Delta Th$ at the respective numbers of gear steps are set to $+\alpha$ to $-\beta$ when the gear change modes are first speed→second speed and second speed→third speed (in case of modes A and B), while the predetermined ranges of $\Delta Th$ at the respective numbers of gear steps are set to $+\gamma$ to $-\delta$ when the gear change mode is third speed→fourth speed or sixth speed→seventh speed (in case of mode C and F). Such setting of the gear change mode is performed to change the setting of C or F which is frequently used during cornering different from the setting of A and B. That is, during cornering in the mode C or F, the predetermined range of $\Delta Th$ is narrowly set so as to make the $\Delta Th$ difficult to fall within the predetermined range thus increasing the frequency that the shift-up is restricted (see step S13 in FIG. 9). Further, as mentioned previously, during cruising in which the motorcycle travels while maintaining a relatively high speed, in many cases, the $\Delta Th$ shifts toward the stable state (displacement: zero) from the minus direction. Accordingly, by setting the predetermined range on the minus side larger than the predetermined range on the plus side, the $\Delta Th$ may easily fall within the predetermined range thus lowering the frequency that the shift-up is restricted.

As described above, according to the automatic transmission control device of the present invention, the shift-up is restricted when the $\Delta Th$ which is the displacement of the throttle opening exceeds the predetermined range. Accordingly, with the simple constitution which does not requires a steering angle detection sensor or the like, it is possible to effectively restrict the undesired shift-up during cornering. Further, even immediately after the $\Delta Th$ falls within the predetermined range, the shift-up restriction timer is operated so as to restrict the shift-up for the predetermined period. Accordingly, it is possible to faithfully reflect the opening manipulation of the throttle which is performed for controlling posture of the vehicle-body during cornering to the behavior of the vehicle body. Further, the predetermined range of $\Delta Th$ can be changed corresponding to the gear step at the time of performing the shift-up and, at the same time, absolute values of an upper limit and a lower limit of the predetermined range are set to numerical values different from each other. Accordingly, when the restriction of the shift-up is unnecessary such as low speed traveling or cruising, it is possible to prevent the shift-up restriction control from being performed.

Here, the predetermined range of the displacement $\Delta Th$ of the throttle opening Th, the correlation between the predetermined range of the $\Delta Th$ and the gear step at the time of performing the shift-up and the like are not limited to the above-mentioned embodiments and various modifications are conceivable.

We claim:

1. An automatic transmission control device for a vehicle having a gear change operation that is performed based on a throttle opening, a vehicle speed and an engine rotational speed, the automatic transmission control device further comprising:

obtaining means for obtaining a displacement of the throttle opening;

determining means for determining whether the displacement falls within a predetermined range; and restricting means for restricting a shift-up when the displacement exceeds the predetermined range;

wherein the predetermined range is set such that the range differs corresponding to a gear step at the time of performing the shift-up; and wherein the predetermined range comprises a numerical value on a predetermined plus side and a numerical value on a predetermined minus side, and an absolute value of the numerical value on the predetermined plus side is set smaller than an absolute value of the numerical value on the predetermined minus side at a predetermined gear step.

2. The automatic transmission control device according to claim 1, wherein the restricting means restricts the shift-up for a predetermined period even immediately after the displacement of the throttle opening falls within the predetermined range.

3. The automatic transmission control device according to claim 1, wherein the automatic transmission control device is for a motorcycle.

\* \* \* \* \*